3,077,436
CONCENTRATED WATER-SOLUBLE DIGOXIN COMPOSITIONS
Erwin Kohlstaedt, Frankfurt am Main, Wilhelm Schmidt, Buchschlag, Kreis Offenbach (Main), and Herbert Schneider, Frankfurt am Main, Germany, assignors to Chemiewerk Homburg, Zweigniederlassung der Deutschen Gold- und Silber-Scheideanstalt, vorm. Roessler (Degussa), Frankfurt am Main, Germany, a German corporation
No Drawing. Filed Aug. 22, 1958, Ser. No. 756,524
Claims priority, application Germany Aug. 22, 1957
10 Claims. (Cl. 167—67)

This invention relates to a process for the production of water-soluble preparations and concentrated and stable aqueous solutions.

Digoxin is formed by the splitting-off of 1 mol. of glucose and 1 mol. of acetic acid from the glycoside lanatoside C contained in *Digitalis lanata* Ehrh.

In the preparation of therapeutically applicable digoxin solutions for oral or parenteral application, it must be taken into account that digoxin is substantially insoluble in water. For oral solutions, a mixture of water and alcohol or other suitable organic solvents may be employed, but organic solvents can only be employed to a limited extent and under certain conditions in solutions intended for injection.

Thus, the British Pharmacopoeia (1953) prescribes 70% ethyl alcohol as solvent for digoxin in ampoules. For injection, these ampoules, which contain 0.5 mg. of digoxin in 1 cc. of solution, must be diluted with physiological sodium chloride solution in the ratio of 1:9, since otherwise irritation effects occur as a result of the high alcohol concentration. The dilution must be carried out directly before application, since digoxin crystallizes from the dilute solution after some time. The solution ready for use can only be intravenously injected.

In the U.S. Pharmacopoeia XV, 10% alcohol together with further suitable solution promoters are prescribed for a digoxin injection solution containing 0.25 mg. of digoxin per cc. The solution is only intravenously applicable and it is recommended in "New and Nonofficial Remedies 1952" that the contents of the ampoule be diluted with 10 cc. of sterile isotonic solution and extravenous injection be carefully avoided by reason of the tissue-irritating property of the digoxin injection.

In U.S. Patent No. 2,765,256, propylene glycol in concentrations of 30–40%, together with 5–10% of ethyl alcohol, is mentioned as a suitable solution promoter.

It has now been found that water-soluble preparations and concentrated and stable aqueous solutions can be produced with high digoxin contents by admixing the digoxin with a 7-substituted theophylline compound, a 1-substituted theobromine compound or a mixture of a 7-substituted theophylline compound with a 1-substituted theobromine compound. Examples of the compounds suitable for use in the admixture include: hydroxy-alkylated theophylline, hydroxy-alkylated theobromine, hydroxy-alkylated theophylline and theobromine substituted in the alkyl radical, approximately neutral hydroxy-aminoalkylated theobromine, approximately neutral salts of hydroxy-aminoalkylated theophylline, approximately neutral salts of hydroxy-aminoalkylated theobromine, which aminoalkylated compounds may be substituted in the amino group by, for example, an alkyl, cycloalkyl, aralkyl, aminoalkyl, alkylaminoalkyl and quaternary nitrogen radical, salts of theophylline containing carboxylic acid radicals or derivatives of such radicals, salts of theobromine containing carboxylic acid radicals or derivatives of such radicals, etc. and mixtures thereof, as indicated above.

If salts of theophylline or theobromine derivatives are employed in the preparations in accordance with the invention, either these salts may be employed directly in the preparation of the mixtures in accordance with the invention or the free theophylline or theobromine derivatives may initially be employed in the preparation of the solution, and the corresponding salts may thereafter be formed by the addition of the salt-forming components to the solution.

In a particular embodiment of the invention, the digoxin is worked up together with mixtures of various substituted theophylline or theobromine compounds. Thus, as a result of the formation of additional solution-promoting effects, further quantities of digoxin, and if desired further quantities of substituted theobromine or theophylline compounds, may be kept in solution without solid substances separating from these solutions on standing for a relatively long time.

In accordance with a further embodiment of the invention, there may also be added to the mixtures according to the invention natural purines, such as theophylline, theobromine, caffeine, adenine, adenosine or mixtures thereof. Here again, the solubility of these natural purines may be influenced and considerably increased by suitable choice of various substituted theophylline or theobromine compounds.

If an even further improvement of the solubility of the digoxin in the mixtures in accordance with the invention is desired, there may be added to such mixtures physiologically acceptable monohydric or polyhydric alcohols, such as ethanol, propylene glycol or glycerol.

The digoxin solutions in accordance with the invention allow the therapeutically necessary quantity of digoxin to be contained in ampoules of 1–2 cc. capacity. It is thus possible for the first time to inject the ampoule contents in undiluted form with completely satisfactory tolerance, not only intravenously, but also intramuscularly. From the pharmacological standpoint, it is particularly important that there have been found in the purine compounds, in contrast to known solution promoters, substances which support the action of the digoxin in an extremely effective manner. Owing to their coronary activity, purine compounds produce an increase in the coronary circulation, whereby digoxin is more rapidly and completely brought to the heart muscles. This fact was manifested by the following experiments.

(a) PHARMACOLOGY

The supporting action of the purine compounds was extensively studied in tests on animals using as example the combination of 1-($\beta$-hydroxypropyl)-theobromine with digoxin. Knaffl-Lenz (Handbuch der biologischen Arbeitsmethoden, section IV, part 7B, page 1566), describe a method of biological evalution of glycosides acting as cardiac stimulants. In this method, the $LD_{100}$, i.e. the dose of an active material resulting in death of all animals exposed thereto, is determined by means of an exactly described process by slow infusion of the solution of active material into the blood stream of the animals. In case of slow infusion of digoxin solution into the v. jugularis of guinea pigs, the lethal dose was found to be 0.9 mg. of digoxin per kg. of guinea pig.

In a second series of tests digoxin combined with 1-($\beta$-hydroxypropyl)-theobromine in a ratio of 1:1,000 was infused to guinea pigs. In this case, the lethal dose was found to be 0.46 mg. of digoxin per kg. of guinea pig. Thus, the efficiency of digoxin was found to be increased by about 100% in case of combined administration with the purine compound.

In tests on isolated frog hearts the interesting observation was made that a combination of purine compounds with digoxin has practically the same toxicity as digoxin alone. Since the hearts of cold-blooded animals have no coronary vessels, it is proved herewith that the toxicity-increasing action of the purine compound is due to its effect of enlarging the coronary vessels. Increase in toxicity is practically equivalent to increase in efficiency.

When combined with a purine derivative, digoxin is transferred to the cardiac muscle so rapidly and completely that, as compared with the action of digoxin alone, the same effect can be achieved with considerably smaller doses of digoxin.

So the combinations of digoxin and purine derivatives show the same effect as it is described for strophanthin and combinations of strophanthin with 7-(β-hydroxyethyl)-theophylline and other agents having the effect of enlarging the coronary vessels (Dörner, Arch. f. exp. Path. u. Pharmakol., vol. 226, 152 (1955), Pharmacological Institute of the University of Giessen).

(b) CLINICAL OBSERVATIONS

In hitherto unpublished informative clinical-experimental studies, the following results were obtained in analyses of the cardiac circulation according to Blumenberger (Erg. der inn. Med. u. Kinderheilk, 62, 424 (1942)):

(1) The therapeutically desirable, positively inotropic effect of a medicament on the cardiac muscle evidences itself by a reduction of the time of systolic ejection. In case of combined administration of 1-(β-hydroxypropyl)-theobromine and digoxin (1,000:1), the reduction in the time of the systolic ejection as compared with digoxin alone was found to be greater by a maximum of 16% with 7 of 9 patients. Thus, the positively inotropic action of the combination is superior to that of digoxin.

(2) Digoxin alone reduced the cardiac frequency of the same patients by a maximum of 23%. When combined with 1-(β-hydroxypropyl)-theobromine, an additional reduction in frequency up to a maximum of 24% was obtained in 5 of 9 cases. This result indicates that the negatively chronotropic effect of the combination of 1-(β-hydroxypropyl)-theobromine+digoxin (1,000:1) is higher than that of digoxin alone.

(3) In 6 of 9 cases the reduction in the systolic period in case of administering 1-(β-hydroxypropyl)-theobromine+digoxin (1,000:1) was greater by a maximum of 13% as compared with that obtained when administering digoxin alone. This indicates that the addition of the purine compound increases the cardiac force still more than does digoxin alone.

All of the results are absolutely comparable since they were checked with the same patients. The results obtained on man confirm the fact found in experiments on animals that the efficiency of digoxin is increased by the simultaneous use of a purine compound.

For determining the solution-promoting activity of the various mixtures, the procedure adopted in ascertaining the digoxin solubility in the following table was to add such a quantity of digoxin to an aqueous solution of the solution promoters indicated in each instance that an undissolved surplus remained. After the mixture had been allowed to stand for 24 hours at room temperature with occasional shaking, the quantity of digoxin which had entered into solution in the various mixtures was observed.

Alternatively, in the preparation of a digoxin solution in accordance with the invention, the digoxin may be brought into solution under heat. In this case, smaller proportions of solution promoters are generally required for the preparation of stable solutions. The values given in the table thus do not indicate the quantity of digoxin having maximum solubility, but they are only relative values for the solution-promoting action of the various preparations.

| No. | Solution promoter | | | Mg. Digoxin per cc. |
|---|---|---|---|---|
| | Purine compound | Percent | Ethanol, percent | |
| 1 | No additions | | | 0.035 |
| 2 | do | | 10 | 0.05 |
| 3 | 7-(β-Hydroxypropyl)-theophylline | 30 | | 0.40 |
| 4 | 7-(β-Hydroxyethyl)-theophylline | 5 | | 0.085 |
| 5 | {7-(β-Hydroxyethyl)-theophylline<br>Theophylline | 8<br>2 | } | 0.12 |
| 6 | {7-(β,γ-Dihydroxypropyl)-theophylline<br>Caffeine | 20<br>6 | } 10 | 0.275 |
| 7 | {7-(β-Hydroxyethyl)-theophylline<br>7-(β,γ-dihydroxypropyl)-theophylline | 10<br>20 | } | 0.225 |
| 8 | 1-(β-Hydroxypropyl)-theobromine | 35 | | 0.17 |
| 9 | 1-(β-Hydroxypropyl)-theobromine | 35 | 10 | 0.40 |
| 10 | 1-(β-Hydroxypropyl)-theobromine | 20 | 10 | 0.155 |
| 11 | {1-(β-Hydroxypropyl)-theobromine<br>Theobromine | 30<br>0.6 | } | 0.27 |
| 12 | {7-(β-Hydroxyethyl)-theophylline<br>1-(β-Hydroxpropyl)-theobromine | 8<br>25 | } | 0.315 |
| 13 | {7-(β-Hydroxyethyl)-theophylline<br>1-(β-Hydroxypropyl)-theobromine | 8<br>25 | } 10 | 0.635 |
| 14 | {7-(β-Hydroxyethyl)-theophylline<br>1-(β-Hydroxypropyl)-theobromine<br>Adenosine | 10<br>20<br>10 | } | 0.30 |
| 15 | 1-(β-Diethylaminoethyl)-theobromine hydrochloride | 30 | 10 | 0.305 |
| 16 | {7-(β-Hydroxyethyl)-theophylline<br>1-(β-Ethylaminoethyl)-theobromine+hydrochloride | 10<br>10 | } | 0.125 |
| 17 | {1-(β-Hydroxyethyl)-theobromine<br>1-(β-Diethylaminoethyl)-theobromine hydrochloride | 10<br>10 | } | 0.115 |
| 18 | 1-(β-Diethylaminoethyl)-theobromine hydrochloride | 30 | | 0.10 |
| 19 | 1-(β-Cyclohexylaminoethyl)-theobromine hydrochloride | 20 | 15% propylene glycol | 0.13 |
| 20 | 1-(β-Benzylaminoethyl)-theobromine hydrochloride | 10 | 12 | 0.155 |
| 21 | 7-(β-Phenylethylaminoethyl)-theophylline hydrochloride | 20 | | 0.17 |
| 22 | 1-Phenyl-2-(7-theophylline-ethylamino)-propanol-(1)hydrochloride | 15 | | 0.14 |
| 23 | N-(7-Theophyllinoethyl)-nicotinic acid diethylamide chloride | 25 | 10 | 0.10 |
| 24 | Theophylline-7-acetic acid diethanolamine salt | 25 | | 0.115 |
| 25 | {Theophylline-7-acetic acid diethylamide<br>1-(β-hydroxypropyl)-theobromine | 7.5<br>20 | } 5 | 0.33 |

The following examples further illustrate the invention.

*Example 1*

0.025 g. of digoxin is dissolved with heating in a mixture of 10 cc. of ethanol and 5 cc. of water. The solution is then combined with a solution of 20 g. of 1-(β-hydroxypropyl)-theobromine in 70 cc. of water, and finally made up to 100 cc. with water. A stable solution containing 0.25 mg. of digoxin per cc. is obtained.

*Example 2*

0.035 g. of digoxin is dissolved in water with heating, together with 8.0 g. of 7(β-hydroxyethyl)-theophylline and 25.0 g. of 1-(β-hydroxypropyl)-theobromine and then the solution is made up to 100 cc. with water. A stable solution containing 0.35 mg. of digoxin per cc. is obtained.

What we claim is:

1. Water-soluble compositions suitable for the preparation of stable and concentrated aqueous solutions of digoxin, comprising digoxin and at least one compound which is a member selected from the group consisting of:
   (a) theophylline substituted in position 7 with a group of formula $R(OH)_n$, wherein R is a lower alkylene group and $n$ is an integer number between 1 and 2;
   (b) hydrohalide salts of theophylline compounds substituted in the 7-position with the group $$R(phenyl)N\begin{matrix}x\\y\end{matrix}$$

wherein R(phenyl) is a lower aromatically-substituted alkylene group and $x$ and $y$ are each a mem-

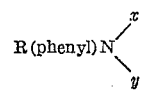

ber selected from the group consisting of H, alkyl, cycloalkyl and aralkyl;

(c) quaternary salts of nitrogenous heterocyclic compounds substituted on the nitrogen atom with the 7-alkyl-theophyline radical;

(d) hydrohalide salts of theobromine derivatives substituted in the 1-position with the group

wherein R is a lower alkylene group and x and y are each a member selected from the group consisting of H, alkyl, cycloalkyl and aralkyl;

(e) theobromine substituted in the 1-position with ROH, wherein R is a lower alkylene group;

(f) quaternary salts of nitrogenous heterocyclic compounds substituted on the nitrogen atom with the 1-alkyl-theobromine radical;

(g) salts of nitrogenous bases with theophylline 7-acetic acid.

2. The water-soluble compositions of digoxin according to claim 1, in aqueous solution, containing a therapeutic quantity of digoxin in ampoules of between 1 and 2 ml. capacity.

3. Water-soluble compositions as claimed in claim 1, additionally comprising at least one natural purine which is a member selected from the group consisting of theophylline, theobromine, caffeine, adenine and adenosine.

4. Water-soluble compositions, as claimed in claim 1, additionally containing at least one member of the group consisting of ethanol, propanol, propylene glycol and glycerol.

5. Water-soluble compositions as claimed in claim 3, additionally containing at least one member of the group consisting of ethanol, propanol, propylene glycol and glycerol.

6. The method of preparing water-soluble compositions of digoxin suitable for oral, intramuscular and intravenous administration, which comprises the steps of mixing digoxin with a compound which is a member selected from the group consisting of theophylline compounds substituted in the 7-position with the group

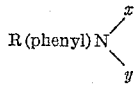

wherein R(phenyl) is a lower aromatically-substituted alkylene group and x and y are each a member selected from the group consisting of H, alkyl, cycloalkyl and aralkyl, and theobromine derivatives substituted in the 1-position with the group

wherein R is a lower alkylene group and x and y are each a member selected from the group consisting of H, alkyl, cycloalkyl and aralkyl, and then adding the hydrogen halide to form the corresponding halide of said substituted theophylline and theobromine component.

7. The method of preparing water-soluble compositions of digoxin suitable for oral, intramuscular and intravenous administration, which comprises the steps of mixing digoxin with a compound which is a hydrohalide salt of a member selected from the group consisting of theophylline compounds substituted in the 7-position with the group

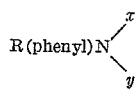

wherein R(phenyl) is a lower aromatically-substituted alkylene group and x and y are each a member selected from the group consisting of H, alkyl, cycloalkyl and aralkyl, and theobromine derivatives substituted in the 1-position with the group

wherein R is a lower alkylene group and x and y are each a member selected from the group consisting of H, alkyl, cycloalkyl and aralkyl.

8. The method of preparing water-soluble compositions of digoxin suitable for oral, intramuscular and intravenous administration, which comprises the steps of mixing digoxin with theophylline 7-acetic acid and then adding an organic nitrogenous base to form the salt of said theophylline-7-acetic acid component.

9. The method of preparing water-soluble compositions of digoxin suitable for oral, intramuscular and intravenous administration, which comprises the steps of mixing digoxin with a salt of theophylline 7-acetic acid and a nitrogenous organic base.

10. The method of promoting the cardiac-stimulating action of digoxin and of reducing the time required for systolic ejection, which consists of administering compositions comprising digoxin and a purine substitution product which is a member selected from the group consisting of (a) theophylline substituted in position 7 with a group of formula $R(OH)_n$, wherein R is a lower alkylene group and $n$ is an integer number between 1 and 2;

(b) hydrohalide salts of theophylline compounds substituted in the 7-position with the group

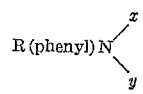

wherein R(phenyl) is a lower aromatically-substituted alkylene group and x and y are each a member selected from the group consisting of H, alkyl, cycloalkyl and aralkyl;

(c) quaternary salts of nitrogenous heterocyclic compounds substituted on the nitrogen atom with the 7-alkyl-theophylline radical;

(d) hydrohalide salts of theobromine derivatives substituted in the 1-position with the group

wherein R is a lower alkylene group and x and y are each a member selected from the group consisting of H, alkyl, cycloalkyl and aralkyl;

(e) theobromine substituted in the 1-position with ROH, wherein R is a lower alkylene group;

(f) quaternary salts of nitrogenous heterocyclic compounds substituted on the nitrogen atom with the 1-alkyl-theobromine radical;

(g) salts of nitrogenous bases with theophylline 7-acetic acid.

References Cited in the file of this patent

UNITED STATES PATENTS

| | | |
|---|---|---|
| 2,715,125 | Rice | Aug. 9, 1955 |
| 2,762,745 | Benend | Sept. 11, 1956 |
| 2,765,256 | Beals et al. | Oct. 2, 1956 |